(12) United States Patent
Fuchs (10) Patent No.: US 9,610,698 B2
(45) Date of Patent: *Apr. 4, 2017

(54) PORTABLE MACHINE TOOL (71) Applicant: Robert Bosch GmbH, Stuttgart (DE)

(72) Inventor: Rudolf Fuchs, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/092,672

(22) Filed: Apr. 7, 2016

(65) Prior Publication Data
US 2016/0221207 A1 Aug. 4, 2016

Related U.S. Application Data (63) Continuation of application No. 14/002,654, filed as application No. PCT/EP2012/000916 on Mar. 2, 2012, now Pat. No. 9,339,878.

(30) Foreign Application Priority Data

Mar. 3, 2011 (DE) ........................ 10 2011 005 036

(51) Int. Cl.
B27B 17/02 (2006.01)
B23D 57/02 (2006.01)
B27B 17/00 (2006.01)

(52) U.S. Cl.
CPC ........ B27B 17/0083 (2013.01); B23D 57/023 (2013.01); B27B 17/00 (2013.01); B27B 17/02 (2013.01)

(58) Field of Classification Search
CPC .... B27B 17/0083; B27B 17/02; B23D 57/023
See application file for complete search history.

(56) References Cited

U.S. PATENT DOCUMENTS 2,348,612 A 2/1941 Deacon
2,296,240 A 9/1942 Biux
(Continued)

FOREIGN PATENT DOCUMENTS

CN 1078417 A 11/1993
EP 0 062 188 A2 10/1982
(Continued)

OTHER PUBLICATIONS

International Search Report corresponding to PCT Application No. PCT/EP2012/000916, mailed Aug. 6, 2012 (German and English language document) (7 pages).

*Primary Examiner* — Hwei C Payer
(74) *Attorney, Agent, or Firm* — Maginot, Moore & Beck LLP (57) ABSTRACT

A power-tool system includes at least one power-tool parting device including at least one cutting strand and at least one guide unit configured to guide the at least one cutting strand. The power tool system further includes at least one portable power tool including (i) a housing, (ii) a drive unit supported by the housing, (iii) at least one coupling device configured to operatively connect the at least one power-tool parting device to the drive unit, and (iv) at least one power-tool stabilization device including at least one stabilization element that is integrally formed with the housing and defines at least one support face configured to stabilize the at least one power-tool parting device.

11 Claims, 5 Drawing Sheets

(56) References Cited

U.S. PATENT DOCUMENTS

| | | | |
|---|---|---|---|
| 2,649,871 A | 8/1953 | Desbarat | |
| 2,839,097 A | 6/1958 | Siria | |
| 2,992,660 A | 7/1961 | Merz | |
| 3,228,436 A | 1/1966 | Ricci | |
| 3,283,789 A | 11/1966 | Silvon | |
| 3,537,347 A | 11/1970 | Rogers | |
| 4,160,319 A | 7/1979 | Caruso | |
| 4,316,327 A | 2/1982 | Scott et al. | |
| 4,382,334 A | 5/1983 | Reynolds | |
| 4,524,519 A * | 6/1985 | Muehling | B27B 33/14 30/382 |
| 4,665,617 A * | 5/1987 | Maier | B23D 49/162 30/374 |
| 4,757,735 A | 7/1988 | Olson | |
| 4,819,332 A | 4/1989 | Sugihara et al. | |
| 4,833,781 A | 5/1989 | Allen | |
| 4,945,641 A * | 8/1990 | Miller | B27G 19/003 30/378 |
| 5,123,168 A | 6/1992 | Lyons | |
| 5,269,064 A * | 12/1993 | Greene | B27G 19/003 30/371 |
| 5,511,315 A | 4/1996 | Raya | |
| 5,535,521 A * | 7/1996 | Alcorn | B27G 19/003 30/286 |
| 5,675,898 A | 10/1997 | Kalber et al. | |
| 6,038,775 A | 3/2000 | Holladay | |
| 6,701,628 B2 | 3/2004 | Mang | |
| 8,015,715 B2 | 9/2011 | Perkins | |
| 8,136,256 B2 * | 3/2012 | Wolf | B27B 17/02 30/381 |
| 9,339,878 B2 * | 5/2016 | Fuchs | B23D 57/023 |
| 2014/0047721 A1 | 2/2014 | Fuchs | |
| 2014/0053417 A1 | 2/2014 | Fuchs | |
| 2014/0075765 A1 | 3/2014 | Fuchs | |
| 2014/0173918 A1 | 6/2014 | Fuchs et al. | |
| 2016/0221207 A1 * | 8/2016 | Fuchs | B27B 17/0083 30/374 |

FOREIGN PATENT DOCUMENTS

| | | |
|---|---|---|
| EP | 0 621 821 B1 | 11/1994 |
| GB | 2 042 974 A | 10/1980 |
| GB | 2 162 463 B * | 1/1988 |
| RU | 2008 137 263 A | 3/2010 |
| WO | 2012/116837 A1 | 9/2012 |
| WO | 2014/032955 A3 | 3/2014 |

* cited by examiner

PORTABLE MACHINE TOOL

This application is a continuation of application Ser. No. 14/002,654 (now U.S. Pat. No. 9,339,878), having a §371(c) date of Nov. 4, 2013, which is a 35 U.S.C. §371 National Stage Application of PCT/EP2012/000916, filed on Mar. 2, 2012, which claims the benefit of priority to Serial No. DE 10 2011 005 036.1, filed on Mar. 3, 2011 in Germany, the disclosures of which are incorporated herein by reference in their entirety.

BACKGROUND

There are already known portable power tools that have a coupling device. The coupling device in this case is provided for coupling to a power-tool parting device that comprises at least one cutting strand and at least one guide unit for guiding the cutting strand.

SUMMARY

The disclosure is based on a portable power tool, in particular on a hand-held power tool, having at least one coupling device, which is provided for coupling to a power-tool parting device that comprises at least one cutting strand and at least one guide unit for guiding the cutting strand.

It is proposed that the portable power tool comprise a power-tool stabilization device, which, in a region disposed outside of the coupling device, has at least one stabilization element that has at least one support face for stabilizing the power-tool parting device. A "portable power tool" is to be understood here to mean a power tool, in particular a hand-held power tool, that can be transported by an operator without the use of a transport machine. The portable power tool has, in particular, a mass of less than 40 kg, preferably less than 10 kg, and particularly preferably less than 5 kg. A "coupling device" is to be understood here to mean, in particular, a device provided to operatively connect the power-tool parting device to the portable power tool, by means of a positive and/or non-positive connection, for the purpose of working a workpiece. In particular, when the coupling device has been coupled to the power-tool parting device and the portable power tool is in an operating state, forces and/or torques can be transmitted from the drive unit of the portable power tool to the power-tool parting device, for the purpose of driving the cutting strand. The coupling device is therefore preferably realized as a tool receiver. A "cutting strand" is to be understood here to mean, in particular, a unit provided to locally undo an atomic coherence of a workpiece to be worked, in particular by means of a mechanical parting-off and/or by means of a mechanical removal of material particles of the workpiece. "Provided" is intended here to mean, in particular, specially configured and/or specially equipped. Preferably, the cutting strand is provided to separate the workpiece into at least two parts that are physically separate from each other, and/or to part off and/or remove, at least partially, material particles of the workpiece, starting from a surface of the workpiece. Particularly preferably, the cutting strand, in at least one operating state, is moved in a revolving manner, in particular along a circumference of the guide unit.

A "guide unit" is to be understood here to mean, in particular, a unit provided to exert a constraining force upon the cutting strand, at least along a direction perpendicular to a cutting direction of the cutting strand, in order to define a possibility for movement of the cutting strand along the cutting direction. Preferably, the guide unit has at least one guide element, in particular a guide groove, by which the cutting strand is guided. Preferably, the cutting strand, as viewed in a cutting plane, is guided by the guide unit along an entire circumference of the guide unit, by means of the guide element, in particular the guide groove. Preferably, the guide unit is realized as a guide bar. The term "guide bar" is intended here to define, in particular, a geometric form that, as viewed in the cutting plane, has a fully closed outer contour, comprising at least two straight lines that are parallel to each other and at least two connecting portions, in particular arcs, that each interconnect mutually facing ends of the straight lines. The guide unit therefore has a geometric shape that, as viewed in the cutting plane, is composed of a rectangle and at least two circle sectors disposed on opposing sides of the rectangle. The term "cutting plane" is intended here to define, in particular, a plane in which the cutting strand, in at least one operating state, is moved, relative to the guide unit, along a circumference of the guide unit, in at least two mutually opposite cutting directions. Preferably, during working of a workpiece, the cutting plane is aligned at least substantially transversely in relation to a workpiece surface that is to be worked. "At least substantially transversely" is to be understood here to mean, in particular, an alignment of a plane and/or of a direction, relative to a further plane and/or a further direction, that preferably deviates from a parallel alignment of the plane and/or of the direction, relative to the further plane and/or the further direction. It is also conceivable, however, for the cutting plane, during working of a workpiece, to be aligned at least substantially parallelwise in relation to a workpiece surface that is to be worked, in particular if the cutting strand is realized as an abrasive. "At least substantially parallelwise" is to be understood here to mean, in particular, an alignment of a direction relative to a reference direction, in particular in one plane, the direction deviating from the reference direction by, in particular, less than 8°, advantageously less than 5°, and particularly advantageously less than 2°.

A "cutting direction" is to be understood here to mean, in particular, a direction along which the cutting strand is moved, in at least one operating state, as a result of a driving force and/or a driving torque, in particular in the guide unit, for the purpose of generating a cutting clearance and/or parting-off and/or removing material particles of a workpiece that is to be worked. Preferably, the cutting strand, when in an operating state, is moved, relative to the guide unit, along the cutting direction. The term "closed system" is intended here to define, in particular, a system comprising at least two components that, by means of combined action, when the system has been demounted from a system such as, for example, a power tool, that is of a higher order than the system, maintain a functionality and/or are inseparably connected to each other when in the demounted state. Preferably, the at least two components of the closed system are connected to each other so as to be at least substantially inseparable by an operator. "At least substantially inseparable" is to be understood here to mean, in particular, a connection of at least two components that can be separated from each other only with the aid of parting tools such as, for example, a saw, in particular a mechanical saw, etc. and/or chemical parting means such as, for example, solvents. A "tool stabilization device" is to be understood here to mean, in particular, a device provided to exert at least a supporting force upon the power-tool parting device, in particular upon the guide unit, along a direction running at least substantially perpendicularly in relation to the cutting plane of the cutting strand, during working of a workpiece, in order to stabilize the guide unit, in particular in order to prevent and/or reduce bending of the guide unit. Particularly preferably, the power-tool stabilization device exerts a supporting force upon the power-tool parting device, in particular upon the guide unit, in a partial region of the power-tool parting device, in particular of the guide unit, that, as viewed along a direction facing away from the portable power tool, is disposed between a power-tool housing and a surface of the tool to be worked.

A "region disposed outside of the coupling device" is to be understood here to mean, in particular, a region of the portable power tool, in particular of a power-tool housing, that is disposed at a distance of at least more than 1 cm, preferably more than 3 cm, and particularly preferably at least more than 6 cm from a rotation axis of an output element of a drive unit and/or of a transmission unit of the portable power tool for driving the cutting strand, and/or is to be understood here to mean, in particular, a region of the power-tool parting device, in particular of the guide unit, that is not directly engaged by coupling members of the coupling device and/or that does not bear directly against the coupling members for the purpose of positively and/or non-positively connecting the power-tool parting device. The term "stabilization" is intended here to define, in particular, an action of at least one constraining force, emanating from the tool stabilization device, upon the power-tool parting device, in particular upon the guide unit, when the power-tool parting device is coupled to the coupling device, which action is provided to prevent, at least insofar as possible, an alignment of the power-tool parting device, in particular of a longitudinal axis of the guide unit, from deviating from a specified alignment of the power-tool parting device. A "constraining force" is to be understood here to mean, in particular, a force provided to prevent a body from moving in at least one direction and/or to keep the body, during a movement, on a path defined through action of the force upon the body. Advantageously, the design according to the disclosure makes it possible to achieve comfortable working with use of the power-tool parting device. It is also advantageously possible, in particular, to advantageously prevent bending of the guide unit during working of a workpiece.

It is furthermore proposed that the tool stabilization device have at least one further stabilization element, which has at least one support face and which, together with the stabilization element, delimits a stabilization region. Preferably, the power-tool parting device, when coupled to the coupling device, is disposed at least partially in the stabilization region. Particularly preferably, the power-tool parting device, in particular the guide unit, when coupled to the coupling device, is disposed, at least partially, between the stabilization element and the further stabilization elements of the tool stabilization device, along a direction running at least substantially perpendicularly in relation to a cutting plane of the cutting strand. The expression "between" is intended here to define, in particular, a spatial disposition of a component, along at least one direction, between two partial regions of a further component or between two further components, wherein there preferably exists along the direction at least one straight line that intersects the component and the two partial regions of the further component, or the component and the two further components. Advantageously, at least the guide unit bears against the at least two stabilization elements, at least in a partial region of the guide unit. Preferably, respectively one of two outer faces of the guide unit bears directly, in a partial region, against a respective side wall of one of the stabilization elements that faces toward the guide unit. Preferably, each outer face bears against the side wall of one of the stabilization elements that faces toward the guide unit by, in each case, more than 10% of a total surface area of the outer face, preferably by more than 20%, and particularly preferably by more than 30%. In particular, the outer faces bear against the coupling elements in a partial region of the guide unit that is disposed at a distance from a torque input point, for driving the cutting strand, that is at least more than 5%, preferably more than 10%, and particularly preferably at least more than 15% of a total length of the guide unit. The stabilization elements are thus preferably provided to stabilize and/or support the power-tool parting device, in particular the guide unit, in at least two opposing directions. Advantageously, the power-tool parting device, in particular the guide unit, can be stabilized on both sides. In addition, particularly advantageously, it is possible to achieve a high degree of lateral stability of the power-tool parting device, in particular of the guide unit, while work is being performed on workpieces.

It is additionally proposed that the portable power tool have at least one seating unit, for seating on a workpiece. A "seating unit" is to be understood here to mean, in particular, a unit that is seated on the workpiece, in particular with the seating face of the seating unit, while work is being performed on a workpiece by means of the portable power tool, the portable power tool being handled in the correct manner, and which is provided to support the portable power tool on the workpiece while work is being performed on the workpiece. Particularly preferably, the seating unit is realized as a sliding pad and/or as a base plate. Preferably, while work is being performed on a workpiece, the portable power tool slides, by means of the seating unit, in particular with the seating face of the seating unit, on a surface of the workpiece that is to be worked. Advantageously, the portable power tool can be guided while work is being performed on a workpiece. In addition, advantageously, it is possible to achieve a high degree of operating comfort for an operator while performing work on a workpiece by means of the portable power tool.

Preferably, the stabilization element and/or the further stabilization element has an extent that, as viewed along a that is at least substantially perpendicular to a seating face of the seating unit, closes in an at least substantially flush manner with the seating face. Particularly preferably, the stabilization element and/or the further stabilization element has an extent that, as viewed along a direction that faces away from the portable power tool, in particular from a power-tool housing of the portable power tool, closes in an at least substantially flush manner with the seating face of the seating unit. "Close in an at least substantially flush manner" is to be understood here to mean, in particular, a disposition of the stabilization element and/or of the further stabilization element, when in a mounted state, wherein the stabilization element and/or the further stabilization element, when in a mounted state, as viewed along a longitudinal axis of the stabilization element and/or of the further stabilization element, extends, starting from a power-tool housing, in the direction of the seating face of the seating unit, and extends/extend maximally as far as the seating face of the seating unit. Particularly preferably, the stabilization element and/or the further stabilization element is integral with the power-tool housing.

"Integral with" is to be understood to mean, in particular, connected at least in a materially bonded manner, for example by a welding process, an adhesive process, an injection process and/or another process considered appropriate by persons skilled in the art, and/or, advantageously, formed in one piece such as, for example, by being produced from a casting and/or by being produced in a single or multi-component injection process and, advantageously, from a single blank. It is also conceivable, however, for the stabilization element and/or the further stabilization element to be constituted by a component realized separately from the power-tool housing, and to be operatively connected to the power-tool housing by means of a positive and/or non-positive connection. The stabilization element and/or the further stabilization element in this case can be accommodated, at least partially, in a recess of the power-tool housing. Advantageously, a function for protection against torn-out chips can be achieved by means of the stabilization element and/or the further stabilization element.

It is additionally proposed that the tool stabilization device have at least one spring element, which is provided to exert a spring force upon at least the stabilization element and/or the further stabilization element. A "spring element" is to be understood to mean, in particular, a macroscopic element having at least one extent that, in a normal operating state, can be varied elastically by at least 10%, in particular by at least 20%, preferably by at least 30%, and particularly advantageously by at least 50% and that, in particular, generates a counter-force, which is dependent on the variation of the extent and preferably proportional to the variation and which counteracts the variation. An "extent" of an element is to be understood to mean, in particular, a maximum distance of two points of a perpendicular projection of the element on to a plane. A "macroscopic element" is to be understood to mean, in particular, an element having an extent of at least 1 mm, in particular of at least 5 mm, and preferably of at least 10 mm. By means of the design according to the disclosure, the stabilization element and/or the further stabilization element can be adapted to a depth of cut of the power-tool parting device, in particular of the cutting strand.

The disclosure is additionally based on a power-tool parting device, in particular a hand-held power-tool parting device, for a portable power tool according to the disclosure. The power-tool parting device comprises at least one cutting strand, and at least one guide unit that, at least together with the cutting strand, constitutes a closed system. Advantageously, the power-tool parting device comprises at least one torque transmission element, for driving the cutting strand, which torque transmission element is mounted, at least partially, in the guide unit. Preferably, the torque transmission element is surrounded, at least partially, at least along one direction, by outer walls of the guide unit. Preferably, the torque transmission element has a concentric coupling recess, in which a pinion gear of the motor unit and/or a toothed wheel and/or a toothed shaft of the transmission unit can engage, when in a mounted state. The coupling recess in this case is preferably constituted by an internal hexagon. It is also conceivable, however, for the coupling recess to be of another design considered appropriate by persons skilled in the art. Through simple design means, the design of the power-tool parting device according to the disclosure makes it possible to achieve a closed system that may be conveniently mounted, by an operator, on a power tool provided for the purpose. Advantageously, therefore, the operator does not need to individually mount components such as, for example, the cutting strand, the guide unit and the torque transmission element, in order to use the power-tool parting device according to the disclosure.

It is furthermore proposed that the cutting strand have at least one cutter carrying element, which, on a side of the cutter carrying element that faces toward the torque transmission element, has at least one recess, in which the torque transmission element engages, in at least one operating state, for the purpose of driving the cutting strand. The torque transmission element in this case is preferably realized as a toothed wheel, which, along a circumferential direction running in a plane that extends perpendicularly in relation to the rotation axis, has a multiplicity of teeth for driving the cutting strand. The recess of the cutter carrying element is preferably realized so as to correspond to an outer contour of the teeth of the torque transmission element realized as a toothed wheel. It is also conceivable, however, for the torque transmission element and/or the cutter carrying element to be of another design considered appropriate by persons skilled in the art.

The disclosure is additionally based on a power-tool system having at least one portable power tool according to the disclosure and having at least one power-tool parting device according to the disclosure. Advantageously, the tool stabilization device is provided to stabilize the power-tool parting device, when coupled to the coupling device, as viewed along a direction that faces away from the portable power tool, in a region of the power-tool parting device disposed outside of the coupling device, along a direction that runs at least substantially perpendicularly in relation to a cutting plane of the cutting strand. Advantageously, it is possible to achieve a high degree of lateral stability of the power-tool parting device, in particular of the guide unit, while work is being performed on a workpiece.

The power-tool parting device according to the disclosure and/or the portable power tool according to the disclosure are not intended in this case to be limited to the application and embodiment described above. In particular, the power-tool parting device according to the disclosure and/or the portable power tool according to the disclosure may have individual elements, components and units that differ in number from the number stated herein, in order to fulfill a principle of function described herein.

According to an exemplary embodiment of the disclosure, a power-tool system includes at least one power-tool parting device and at least one portable power tool. The at least one power-tool parting device includes at least one cutting strand and at least one guide unit configured to guide the at least one cutting strand. The at least one portable power tool includes (i) a housing, (ii) a drive unit supported by the housing, (iii) at least one coupling device configured to operatively connect the at least one power-tool parting device to the drive unit, and (iv) at least one power-tool stabilization device including at least one stabilization element that is integrally formed with the housing and defines at least one support face configured to stabilize the at least one power-tool parting device.

According to another exemplary embodiment of the disclosure, a power tool includes a housing, a drive unit supported by the housing, at least one power-tool parting device supported by the housing and including at least one cutting strand and at least one guide unit configured to guide the at least one cutting strand, at least one coupling device configured to operatively connect the at least one power-tool parting device to the drive unit; and at least one power-tool stabilization device including a first stabilization element that is integrally formed with the housing as a monolithic piece and a second stabilization element that is integrally formed with the housing as a monolithic piece. The first stabilization element defines a first support face configured to stabilize the at least one guide unit from moving in a first direction. The second stabilization element defines a second support face configured to stabilize the at least one guide unit from moving in a second direction. The second direction is opposite of the first direction.

According to yet another exemplary embodiment of the disclosure, a power tool includes a housing, a drive unit supported by the housing, at least one power-tool parting device supported by the housing and including at least one cutting strand and at least one guide unit configured to guide the at least one cutting strand, at least one coupling device configured to operatively connect the at least one power-tool parting device to the drive unit, and at least one power-tool stabilization device supported by the housing and including a first stabilization element and a second stabilization element, the first stabilization element defining a first support face located on a first side of the at least one guide unit, and the second stabilization element defining a second support face located on a second side of the at least one guide unit that is opposite of the first side.

BRIEF DESCRIPTION OF THE DRAWINGS

Further advantages are given by the following description of the drawing. The drawing shows exemplary embodiments of the disclosure. The drawing, the description and the claims contain numerous features in combination. Persons skilled in the art will also expediently consider the features individually and combine them to create appropriate further combinations.

In the drawing.

DETAILED DESCRIPTION

Figure 1:
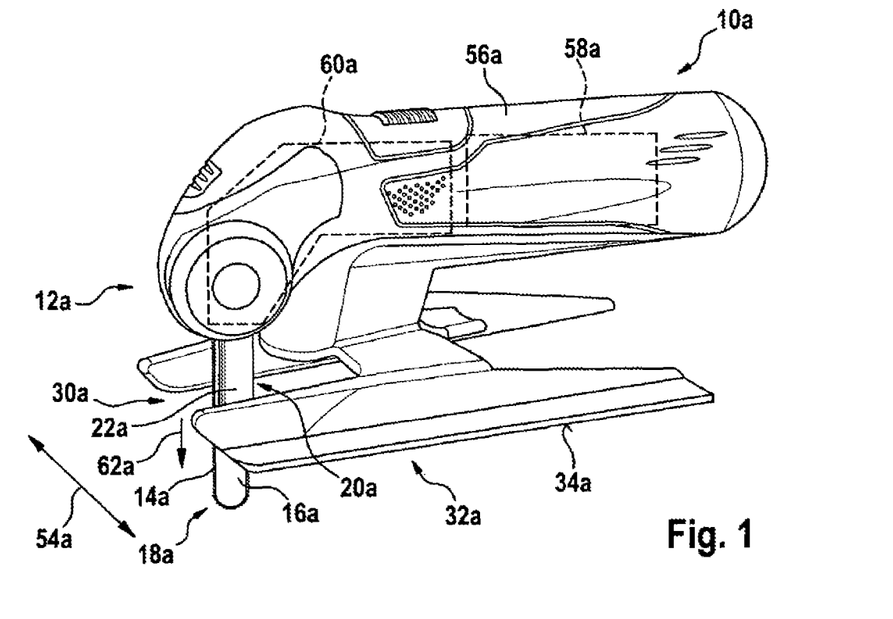
FIG. 1 shows a portable power tool according to the disclosure, having a power-tool parting device according to the disclosure, in a schematic representation.

FIG. 1 shows a portable power tool 10a having a power-tool parting device 18a, which together constitute a power-tool system. The portable power tool 10a has a coupling device 12a for positive and/or non-positive coupling to the power-tool parting device 18a. The coupling device 12a in this case can be realized as a bayonet closure and/or as another coupling device considered appropriate by persons skilled in the art. The portable power tool 10a additionally has a power-tool housing 56a, which encloses a drive unit 58a and a transmission unit 60a of the portable power tool 10a. The drive unit 58a and the transmission unit 60a are operatively connected to each other for the purpose of generating a torque that can be transmitted to the power-tool parting device 18a, in a manner already known to persons skilled in the art. In this case, the drive unit 58a and/or the transmission unit 60a are provided, when in a mounted state, to be coupled to a cutting strand 14a of the power-tool parting device 18a by means of the coupling device 12a. The transmission unit 60a of the portable power tool 10a is realized as a bevel gear transmission. The drive unit 58a is realized as an electric motor unit. It is also conceivable, however, for the drive unit 58a and/or the transmission unit 60a to be of a different design, considered appropriate by persons skilled in the art. The drive unit 58a is provided to drive the cutting strand 14a of the power-tool parting device 18a, at least in one operating state, at a cutting speed of less than 6 m/s. The portable power tool 10a in this case has at least one operating mode in which it is possible for the cutting strand 14a to be driven in a guide unit 16a of the power-tool parting device 18a, along a cutting direction 62a of the cutting strand 14a, at a cutting speed of less than 6 m/s. The portable power tool 10a additionally has a seating unit 32a, for seating on a workpiece (not represented in greater detail here) that is to be worked by means of the portable power tool 10a. The seating unit 32a is realized as a sliding pad and/or as a base plate, by means of which the portable power tool 10a, when properly handled, slides and/or is supported on a workpiece while work is being performed on the workpiece.

The portable power tool 10a furthermore comprises a tool stabilization device 20a, which, in a region disposed outside of the coupling device 12a, has at least one stabilization element 22a, having a support face 24a (FIG. 2), for stabilizing the power-tool parting device 18a. When the power-tool parting device 18a is coupled to the coupling device 12a, the support face 24a of the stabilization element 22a is disposed on a side of the stabilization element 22a that faces toward the guide unit 16a. The tool stabilization device 20a additionally comprises a further stabilization element 26a, having a support face 28a that, together with the stabilization element 22a, delimits a stabilization region 30a for stabilizing the power-tool parting device 18a. The further stabilization element 26a is likewise disposed in the region that is disposed outside of the coupling device 12a. When the power-tool parting device 18a is coupled to the coupling device 12a, the further support face 28a of the further stabilization element 26a is disposed on a side of the further stabilization element 26a that faces toward the guide unit 16a. The support face 24a of the stabilization element 22a and the further support face 28a of the further stabilization element 26a extend at least substantially parallelwise in relation to the cutting plane of the cutting strand 14a. The stabilization element 22a and the further stabilization element 26a are integral with the power-tool housing 56a. The tool stabilization device 20a is is therefore provided to stabilize the guide unit 16a of the power-tool parting device 18a, when coupled to the coupling device 12a, as viewed along a direction that faces away from the portable power tool 10a, in a region of the power-tool parting device 18a disposed outside of the coupling device 12a, along a direction 54a running at least substantially perpendicularly in relation to a cutting plane of the cutting strand 14a. The guide unit 16a in this case bears against the support face 24a of the stabilization element 22a and against the further support face 28a of the further stabilization element 26a.

Figure 2:
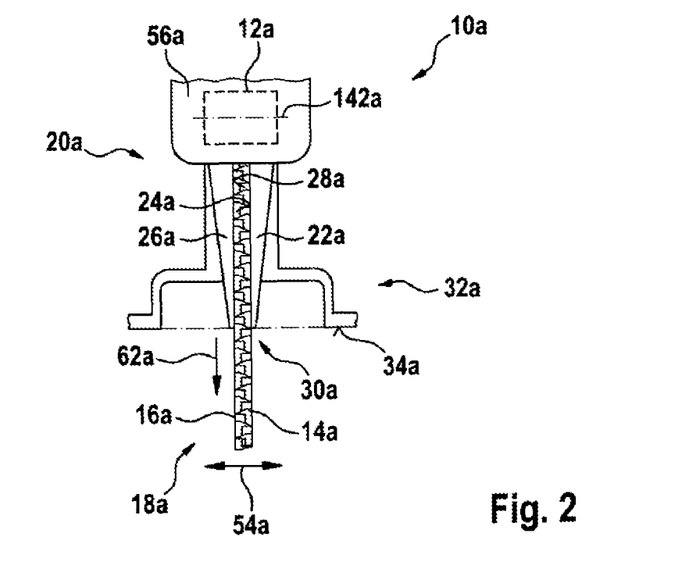
FIG. 2 shows a detail view of the power-tool parting device of the portable power tool according to the disclosure, in a schematic representation.

FIG. 2 shows a disposition of the tool stabilization device 20a on the power-tool housing 56a of the portable power tool 10a. The tool stabilization device 20a, as viewed along a direction that faces away from the power-tool housing 56a, is disposed on the power-tool housing 56a, at a distance from a rotation axis 142a of an output element of the drive unit 58a and/or of the transmission unit 60a for driving the cutting strand 14a, when the power-tool parting device 18a is coupled to the coupling device 12a. The power-tool parting device 18a, when coupled to the coupling device 12a, as viewed along a direction running at least substantially perpendicularly in relation to the cutting plane of the cutting strand 14a, is disposed between the stabilization element 22a and the further stabilization element 26a. The stabilization element 22a and the further stabilization element 26a each have an extent that, starting from the power-tool housing 56a, as viewed along an at least substantially perpendicularly in relation to a seating face 34a of the seating unit 32a, closes with the seating face 34a in an at least substantially flush manner. When work is being performed on a workpiece, the seating face 34a of the seating unit 32a lies on a surface (not represented in greater detail here) of the workpiece. When work is being performed on a workpiece, the stabilization element 22a and the further stabilization element 26a lie on the surface of the workpiece, in each case with one side facing toward the workpiece. During working of a workpiece, in addition to stabilizing the guide unit 16a, therefore, the stabilization element 22a and the further stabilization element 26a are provided to prevent chips from being torn out in the region of cut edges of a cut that can be made by means of the cutting strand 14a, while work is being performed on a workpiece.

The stabilization element 22a and the further stabilization element 26a additionally stabilize the guide unit 16a, during working of a workpiece, in a partial region of the guide unit 16a that, during working of a workpiece, as viewed along the cutting direction 62a of the cutting strand 14a, is disposed between the coupling device 12a and a surface of a workpiece to be worked. In this case, during working of a workpiece, supporting forces act upon the guide unit 16a of the power-tool parting device 18a, along the direction 54a running at least substantially perpendicularly in relation to the cutting plane of the cutting strand 14a, by means of the support face 24a of the stabilization element 22a and by means of the further support face 28a of the further stabilization element 26a.

Figure 3:
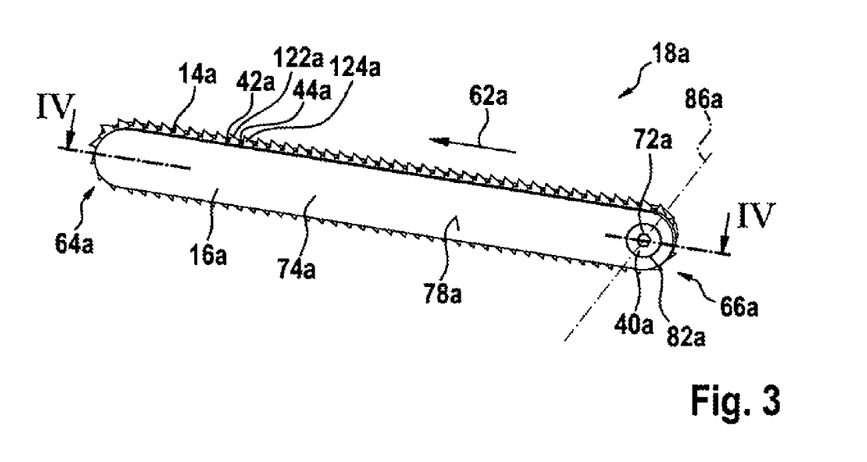
FIG. 3 shows a detail view of a power-tool parting device according to the disclosure, in a schematic representation.
Figure 7:
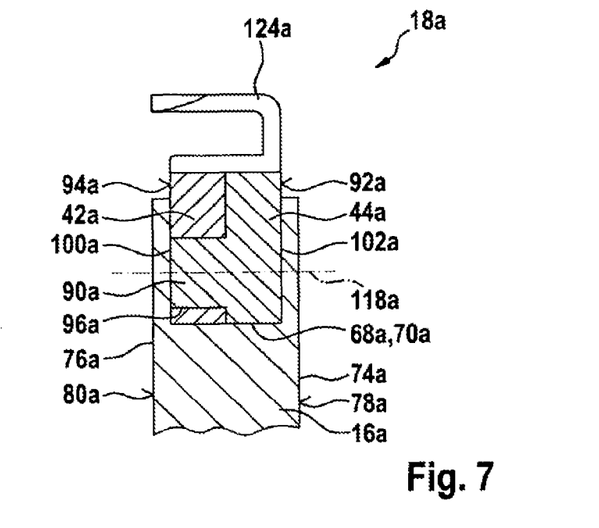
FIG. 7 shows a detail view of a disposition of the cutter carrying elements in a guide unit of the power-tool parting device according to the disclosure, in a schematic representation.

FIG. 3 shows the power-tool parting device 18a when decoupled from the coupling device 12a of the portable power tool 10a. The power-tool parting device 18a comprises the cutting strand 14a and the guide unit 16a, which together constitute a closed system. The guide unit 16a is realized as a guide bar. The guide unit 16a, as viewed in the cutting plane of the cutting strand 14a, additionally has at least two convex ends 64a, 66a. The convex ends 64a, 66a of the guide unit 16a are disposed at sides of the guide unit 16a that face away from each other. The cutting strand 14a is guided by means of the guide unit 16a. For this purpose, the guide unit 16a has at least one guide element 68a (FIG. 7), by means of which the cutting strand 14a is guided. The guide element 68a in this case is realized as a guide groove 70a, which extends, in the cutting plane of the cutting strand 14a, along an entire circumference of the guide unit 16a. The cutting strand 14a in this case is guided by means of edge regions of the guide unit 16a that delimit the guide groove 70a. It is also conceivable, however, for the guide element 68a to be realized in another manner, considered appropriate by persons skilled in the art, such as, for example, as a rib-type element, formed on to the guide unit 16a, that engages in a recess on the cutting strand 14a. The cutting strand 14a, as viewed in a plane running perpendicularly in relation to the cutting plane, is surrounded on three sides by the edge regions that delimit the guide groove 70a (FIG. 7). During operation, the cutting strand 14a is moved in a revolving manner along the circumference, in the guide groove 70a, relative to the guide unit 16a.

Figure 4:
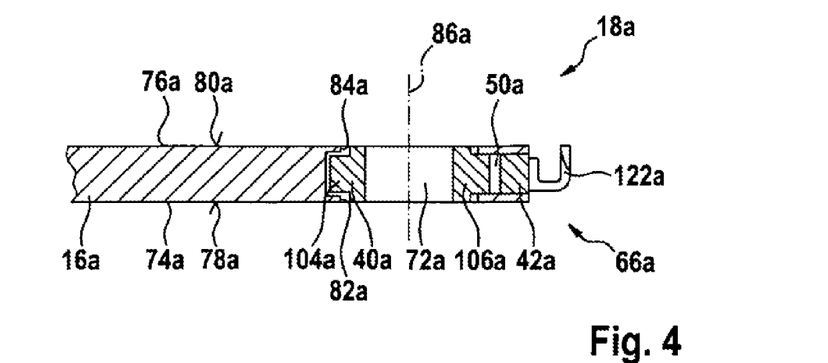
FIG. 4 shows a sectional view, along the line IV-IV from FIG. 3, of the power-tool parting device according to the disclosure, in a schematic representation.

The power-tool parting device 18a additionally has a torque transmission element 40a, for driving the cutting strand 14a, that is at least partially mounted by means of the guide unit 16a. The torque transmission element 40a in this case has a coupling recess 72a that, in a mounted state, can be coupled to the drive unit 58a and/or to the transmission unit 60a. The coupling recess 72a is disposed concentrically in the torque transmission element 40a. The coupling recess 72a is realized as an internal hexagon. It is also conceivable, however, for the coupling recess 72a to be of another design, considered appropriate by persons skilled in the art. When the torque transmission element 40a is decoupled from the drive unit 58a and/or from the transmission unit 60a, the torque transmission element 40a is disposed so as to be movable transversely in relation to the cutting direction 62a of the cutting strand 14a and/or along the cutting direction 62a, in the guide unit 16a (FIG. 4). In this case, the torque transmission element 40a is disposed, at least partially, between two outer walls 74a, 76a of the guide unit 16a. The outer walls 74a, 76a run at least substantially parallelwise in relation to the cutting plane of the cutting strand 14a. In outer faces 78a, 80a of the outer walls 74a, 76a, the guide unit 16a has a respective recess 82a, 84a, in which the torque transmission element 40a is disposed, at least partially.

The torque transmission element 40a is disposed with a partial region in the recesses 82a, 84a of the outer walls 74a, 76a. The torque transmission element 40a in this case, at least in the partial region disposed in the recesses 82a, 84a, has an extent, along a rotation axis 86a of the torque transmission element 40a, that closes in a flush manner with one of the outer faces 78a, 80a of the guide unit 16a. In addition, the partial region of the torque transmission element 40a that is disposed in the recesses 82a, 84a of the outer faces 78a, 80a of the guide unit 16a has an outer dimension, extending at least substantially perpendicularly in relation to the rotation axis 86a of the torque transmission element 40a, that is at least 0.1 mm smaller than an inner dimension of the recesses 82a, 84a that extends at least substantially perpendicularly in relation to the rotation axis 86a of the torque transmission element 40a. The partial region of the torque transmission element 40a that is disposed in the recesses 82a, 84a is disposed, respectively, along a direction running perpendicularly in relation to the rotation axis 86a, at a distance from an edge of the outer walls 74a, 76a that delimits the respective recess 82a, 84a. The partial region of the torque transmission element 40a that is disposed in the recesses 82a, 84a therefore has a clearance within the recesses 82a, 84a.

Figure 5:
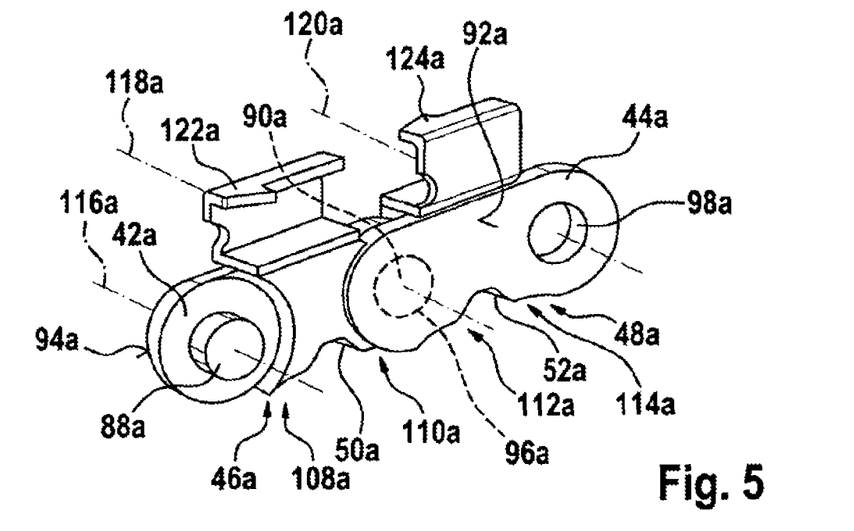
FIG. 5 shows a detail view of cutter carrying elements of a cutting strand of the power-tool parting device according to the disclosure, in a schematic representation.

FIG. 5 shows a detail view of cutter carrying elements 42a, 44a of the cutting strand 14a of the power-tool parting device 18a. The cutting strand 14a comprises a multiplicity of interconnected cutter carrying elements 42a, 44a, which are in each case connected to each other by means of a connecting element 88a, 90a of the cutting strand 14a that closes at least in a substantially flush manner with one of two outer faces 92a, 94a of one of the interconnected cutter carrying elements 42a, 44a (cf. also FIG. 7). The connecting elements 88a, 90a are realized in the form of pins. When the cutting strand 14a is disposed in the guide groove 70a, the outer faces 92a, 94a run at least substantially parallelwise in relation to the cutting plane of the cutting strand 14a. Persons skilled in the art will select an appropriate number of cutter carrying elements 42a, 44a for the cutting strand 14a according to the application. The cutter carrying elements 42a, 44a are each respectively integral with one of the connecting elements 88a, 90a. The cutter carrying elements 42a, 44a additionally have a respective connecting recess 96a, 98a, for receiving one of the connecting elements 88a, 90a of the interconnected cutter carrying elements 42a, 44a. The connecting elements 88a, 90a are guided by means of the guide unit 16a (FIG. 7). In this case, when the cutting strand 16a is in a mounted state, the connecting elements 88a, 90a are disposed in the guide groove 70a. The connecting elements 88a, 90a, as viewed in a plane running perpendicularly in relation to the cutting plane, can be supported on two side walls 100a, 102a of the guide groove 70a. The side walls 100a, 102a delimit the guide groove 70a along a direction running perpendicularly in relation to the cutting plane. In addition, the side walls 100a, 102a of the guide groove 70a, as viewed in the cutting plane, starting from the guide unit 16a, extend outwardly, perpendicularly in relation to the cutting direction 62a of the cutting strand 14a.

Figure 6:
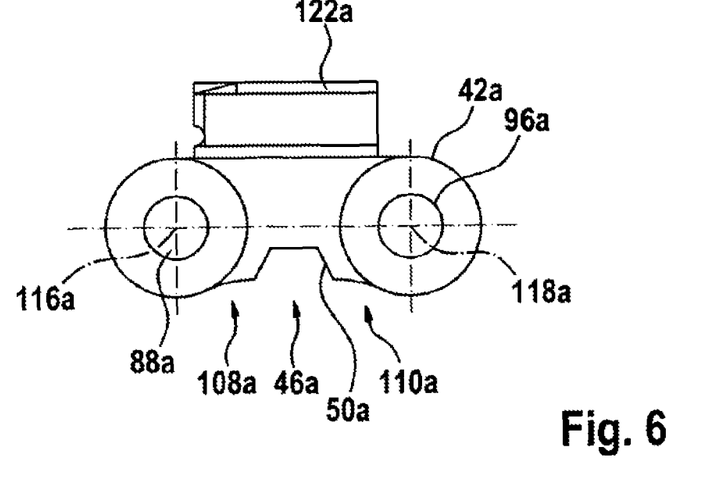
FIG. 6 shows a further detail view of one of the cutter carrying elements of the cutting strand of the power-tool parting device according to the disclosure, in a schematic representation.

The cutter carrying elements 42a, 44a of the cutting strand 14a have a respective recess 50a, 52a that, in a mounted state, is in each case disposed on a side 46a, 48a of the respective cutter carrying element 42a, 44a that faces toward the torque transmission element 40a. The torque transmission element 40a, in at least one operating state, engages in the recesses 50a, 52a, for the purpose of driving the cutting strand 14a. The torque transmission element 40a in this case is realized as a toothed wheel. The torque transmission element 40a therefore comprises teeth 104a, 106a, (FIG. 4), which are provided to engage in the recesses 50a, 52a of the cutter carrying elements 42a, 44a, in at least one operating state, for the purpose of driving the cutting strand 14a. In addition, the sides 46a, 48a of the cutter carrying elements 42a, 44a that face toward the torque transmission element 40a are realized in the form of an arc. The sides 46a, 48a of the cutter carrying elements 42a, 44a that face toward the torque transmission element 40a when in a mounted state are each realized in the form of an arc in partial regions 108a, 110a, 112a, 114a, as viewed between a central axis 116a of the respective connecting element 88a, 90a and a central axis 118a, 120a of the respective connecting recess 96a, 98a. The arc-shaped partial regions 108a, 110a, 112a, 114a are realized such that in each case they adjoin the recesses 50a, 52a, in which the torque transmission element 40a engages. In this case, the arc-shaped partial regions 108a, 110a, 112a, 114a have a radius corresponding to a radius of a course of the guide groove 70a at the convex ends 64a, 66a. The partial regions 108a, 110a, 112a, 114a are concave in form (FIG. 6).

The cutting strand 14a additionally has a multiplicity of cutting elements 122a, 124a. The cutting elements 122a, 124a are integral, respectively, with one of the cutter carrying elements 42a, 44a. The number of cutting elements 122a, 124a depends on the number of cutter carrying elements 42a, 44a. Persons skilled in the art will select a suitable number of cutting elements 122a, 124a according to the number of cutter carrying elements 42a, 44a. The cutting elements 122a, 124a are provided to effect parting-off and/or removal of material particles of a workpiece that is to be worked (not represented in greater detail here). The cutting elements 122a, 124a can be realized, for example, as full cutters, half cutters or as other kinds of cutters, considered appropriate by persons skilled in the art, which are provided to effect parting-off and/or removal of material particles of a workpiece that is to be worked. The cutting strand 14a is continuous. The cutting strand 14a is thus realized as a cutting chain. The cutter carrying elements 42a, 44a in this case are realized as chain links, which are connected to each other by means of the pin-type connecting elements 88a, 90a. It is also conceivable, however, for the cutting strand 14a, the cutter carrying elements 42a, 44a and/or the connecting elements 88a, 90a to be of another design, considered appropriate by persons skilled in the art.

Figure 8:
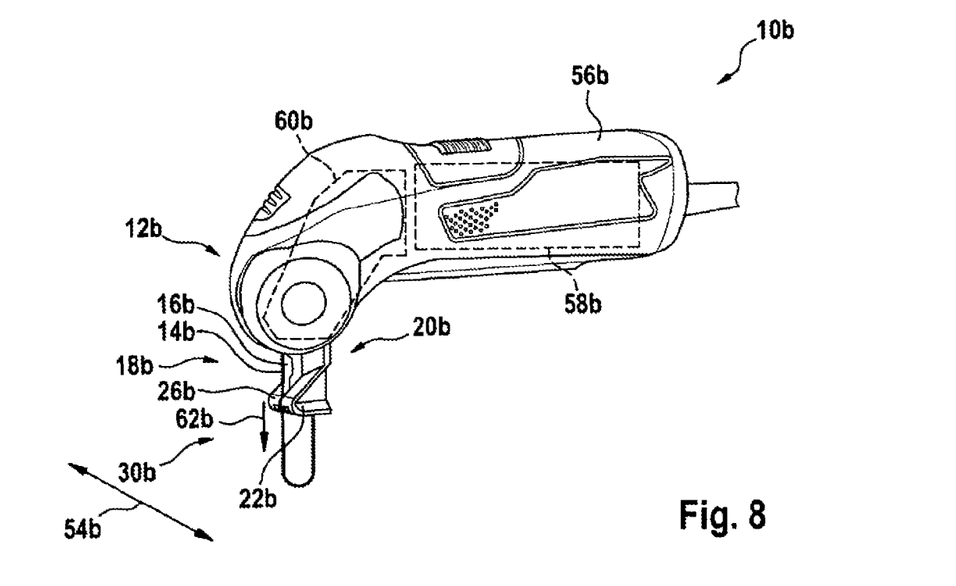
FIG. 8 shows an alternative portable power tool according to the disclosure, having an alternative tool stabilization device, in a schematic representation.
Figure 9:
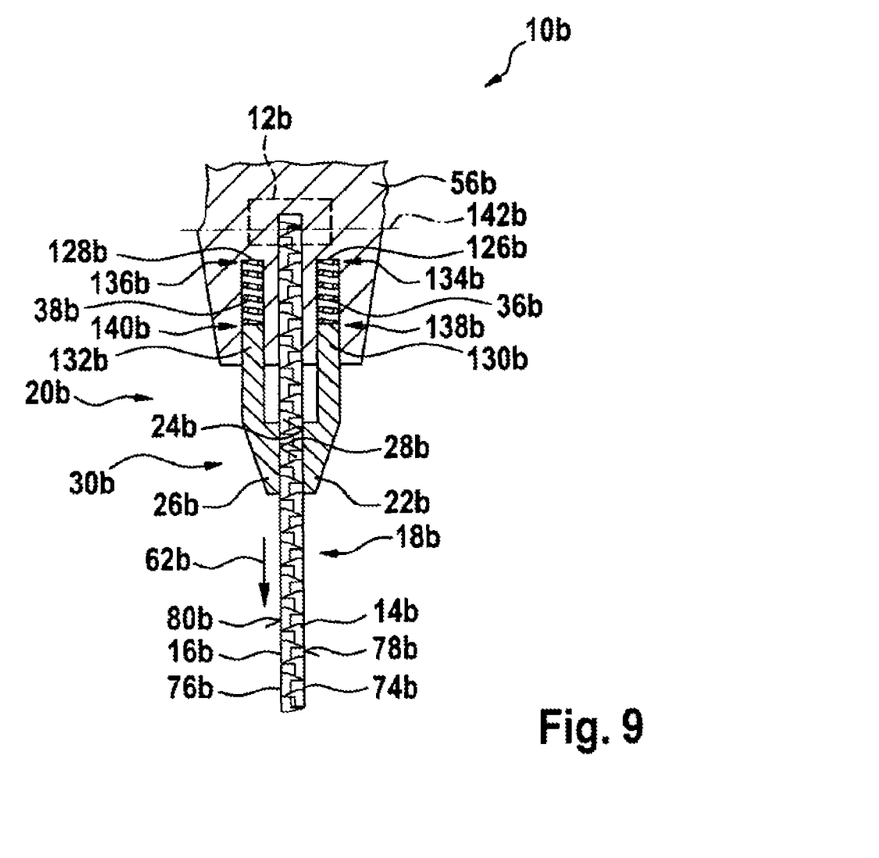
FIG. 9 shows a detail view of the alternative tool stabilization device of the alternative portable power tool according to the disclosure, in a schematic representation.

An alternative exemplary embodiment is represented in FIGS. 8 and 9. Components, features and functions that remain substantially the same are denoted, basically, by the same references. To differentiate the exemplary embodiments, the letters a and b have been appended to the references of the exemplary embodiments. The description that follows is limited substantially to the differences in relation to the first exemplary embodiment, described in FIGS. 1 to 7, and reference may be made to the description of the first exemplary embodiment in FIGS. 1 to 7 in respect of components, features and functions that remain the same.

FIG. 9 shows a portable power tool 10b having a power-tool parting device 18b, which together constitute a power-tool system. The power-tool parting device 18b has a structure similar to that of the power-tool parting device 14a described in FIGS. 1 to 7. The portable power tool 10b has a coupling device 12b, which can be coupled to the power-tool parting device 18b constituted by a cutting strand 14b and a guide unit 16b. In addition, the portable power tool 10b comprises a tool stabilization device 20b. The tool stabilization device 20b in this case is mounted so as to be movable linearly on a power-tool housing 56b of the portable power tool 10b. The power-tool housing 56b has two guide recesses 126b, 128b, in which two guide elements 130b, 132b of the tool stabilization device 20b are disposed, so as to be movable relative to the power-tool housing 56b, when in a mounted state (FIG. 9). The guide elements 126b, 128b are integral with a stabilization element 22b and a further stabilization element 26b of the tool stabilization device 20b. When the power-tool parting device 18b is coupled to the coupling device 12b, the guide recesses 126b, 128b extend in two planes disposed substantially parallelwise and offset in relation to a cutting plane of the cutting strand 14b. In order to secure the guide elements 130b, 132b against falling out of the guide recesses 126b, 128b, the guide elements 130b, 132b are secured in the guide recesses 126b, 128b by means of, for example, threaded pins (not represented in greater detail here), which engage in an oblong hole (not represented in greater detail here) of the guide elements 130b, 132b. It is also conceivable, however, for the guide elements 130b, 132b to be secured against falling out by means of other securing elements considered appropriate by persons skilled in the art. The guide recesses 126b, 128b have a greater extent than the guide elements 130b, 132b along a longitudinal direction of movement of the guide elements 130b, 132b, along which the guide elements 130b, 132b are disposed so as to be movable linearly in the guide recesses 126b, 128b.

The tool stabilization device 20b additionally comprises two spring elements 36b, 38b, which are provided to exert a spring force upon the stabilization element 22b and the further stabilization element 26b, in a direction that faces away from the power-tool housing 56b. The spring elements 36b, 38b in this case are disposed in the guide recesses 126b, 128b. The spring elements 36b, 38b are therefore supported, in each case with an end 134b, 136b of the spring elements 36b, 38b, on an edge region of the power-tool housing 56b that delimits the respective guide recess 126b, 128b. With a further end 138b, 140b of the spring elements 36b, 38b, the spring elements 36b, 38b are supported, respectively, on a side of the respective guide element 130b, 132b that faces toward the respective spring element 36b, 38b. The spring elements 36b, 38b are realized as compression springs. It is also conceivable, however, for the spring elements 36b, 38b to be of another design, considered appropriate by persons skilled in the art. When work is being performed on a workpiece (not represented in greater detail here) by means of the power-tool parting device 18b according to the disclosure, a support face 24b of the stabilization element 22b and a further support face 28b of the further stabilization element 26b, since they are integral with the guide elements 130b, 132b and since the guide elements 130b, 132b are mounted in a movable manner, can slide on outer walls 74b, 76b of the guide unit 16b, along the longitudinal direction of movement of the guide elements 130b, 132b. When work is being performed on a workpiece, the stabilization element 22b and the further stabilization element 26b are pressed on to a surface of the workpiece, owing to the spring force of the spring elements 36b, 38b.

What is claimed is:

1. A power-tool system comprising:
   at least one power-tool parting device including at least one cutting strand and at least one guide unit configured to guide the at least one cutting strand;
   at least one portable power tool including (i) a housing, (ii) a drive unit supported by the housing, (iii) at least one coupling device configured to operatively connect the at least one power-tool parting device to the drive unit, and (iv) at least one power-tool stabilization device including at least one stabilization element that is integrally formed with the housing and defines at least one support face configured to stabilize the at least one power-tool parting device; and
   a seating unit supported by the housing and defining a seating face configured to seat on a workpiece,
   wherein the seating face defines a seating plane, and
   wherein the at least one power-tool stabilization device is located on only one side of the seating plane.

2. The power-tool system as claimed in claim 1, wherein the at least one power-tool stabilization device is configured to stabilize the at least one power-tool parting device, when the at least one power-tool stabilization device is coupled to the at least one coupling device, as viewed along a direction that faces away from the at least one portable power tool, in a region of the at least one power-tool parting device disposed outside of the at least one coupling device, along a direction that runs at least substantially perpendicularly in relation to a cutting plane of the at least one cutting strand.

3. The power-tool system as claimed in claim 1, wherein:
   the at least one power-tool stabilization device includes at least one further stabilization element that is integrally formed with the housing and defines at least one further support face configured to stabilize the at least one power-tool parting device,
   the at least one stabilization element is located on a first side of the at least one guide unit,
   the at least one further stabilization element is located on a second side of the at least one guide unit, and
   the second side is opposite of the first side.

4. A power tool comprising:
   a housing;
   a drive unit supported by the housing;
   at least one power-tool parting device supported by the housing and including at least one cutting strand and at least one guide unit configured to guide the at least one cutting strand;
   at least one coupling device configured to operatively connect the at least one power-tool parting device to the drive unit; and
   at least one power-tool stabilization device including a first stabilization element that is integrally formed with the housing as a monolithic piece and a second stabilization element that is integrally formed with the housing as a monolithic piece,
   wherein the first stabilization element defines a first support face configured to stabilize the at least one guide unit from moving in a first direction,
   wherein the second stabilization element defines a second support face configured to stabilize the at least one guide unit from moving in a second direction, and
   wherein the second direction is opposite of the first direction.

5. The power tool as claimed in claim 4, wherein the at least one power-tool stabilization device is configured to stabilize the at least one power-tool parting device, when the at least one power-tool stabilization device is coupled to the at least one coupling device, as viewed along a direction that faces away from the housing, in a region of the at least one power-tool parting device disposed outside of the at least one coupling device, along a direction that runs at least substantially perpendicularly in relation to a cutting plane of the at least one cutting strand.

6. The power tool as claimed in claim 4, wherein:
   the first support face is located on a first side of the at least one guide unit,
   the second support face is located on a second side of the at least one guide unit, and
   the second side is opposite of the first side.

7. The power tool as claimed in claim 4, further comprising:
   a seating unit supported by the housing and defining a seating face configured to seat on a workpiece,
   wherein the seating face defines a seating plane, and
   wherein the at least one power-tool stabilization device is located on only one side of the seating plane.

8. A power tool comprising:
   a housing;
   a drive unit supported by the housing;
   at least one power-tool parting device supported by the housing and including at least one cutting strand and at least one guide unit configured to guide the at least one cutting strand;
   at least one coupling device configured to operatively connect the at least one power-tool parting device to the drive unit; and
   at least one power-tool stabilization device supported by the housing and including a first stabilization element and a second stabilization element, the first stabilization element defining a first support face configured to bear against the at least one guide unit and located on a first side of the at least one guide unit, and the second stabilization element defining a second support face configured to bear against the at least one guide unit and located on a second side of the at least one guide unit that is opposite of the first side.

9. The power tool as claimed in claim 8, wherein the at least one power-tool stabilization device is configured to stabilize the at least one power-tool parting device as viewed along a direction that faces away from the power tool, in a region of the at least one power-tool parting device disposed outside of the at least one coupling device, along a direction that runs at least substantially perpendicularly in relation to a cutting plane of the at least one cutting strand.

10. The power tool as claimed in claim 8, further comprising:
   a seating unit supported by the housing and defining a seating face configured to seat on a workpiece,
   wherein the seating face defines a seating plane, and
   wherein the at least one power-tool stabilization device is located on only one side of the seating plane.

11. The power tool as claimed in claim 8, wherein the first and second stabilization elements are integrally formed with the housing as a monolithic piece.

\* \* \* \* \*